H. G. RICE.
BOTTLE CAPPER.
APPLICATION FILED SEPT. 10, 1921.
Reissued Nov. 8, 1921. 15,222.
2 SHEETS—SHEET 1.
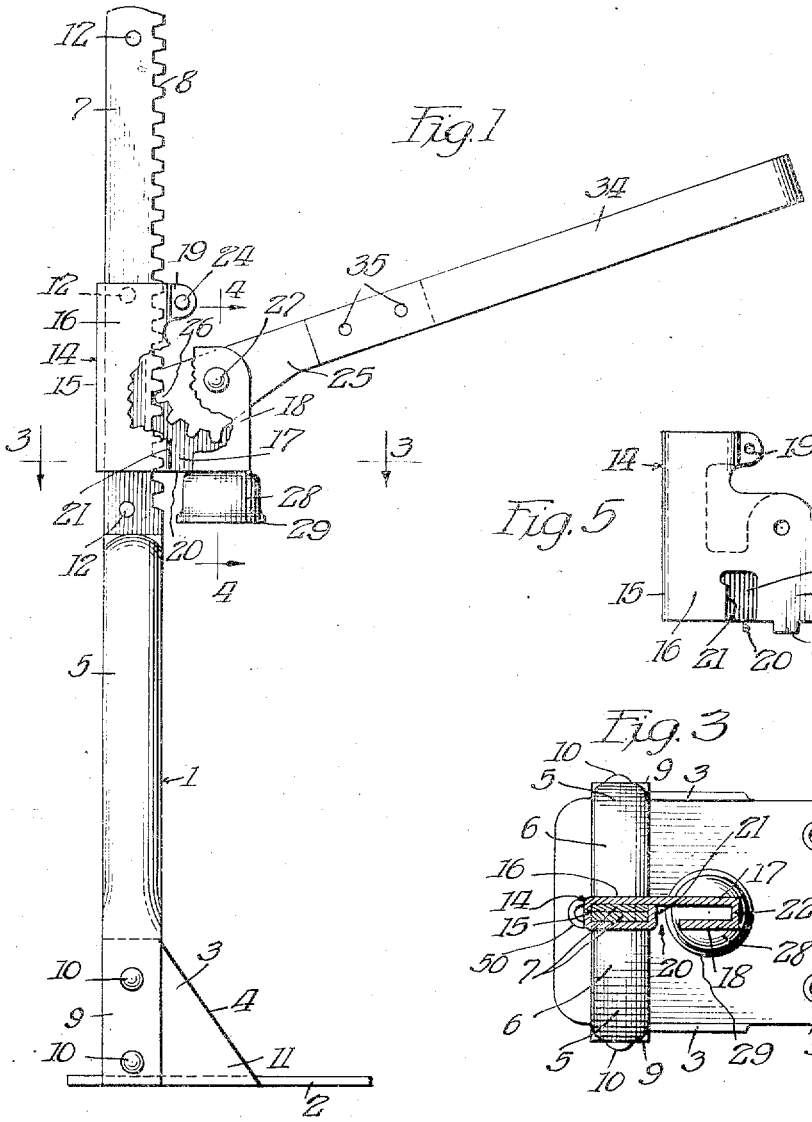
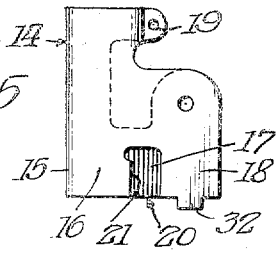
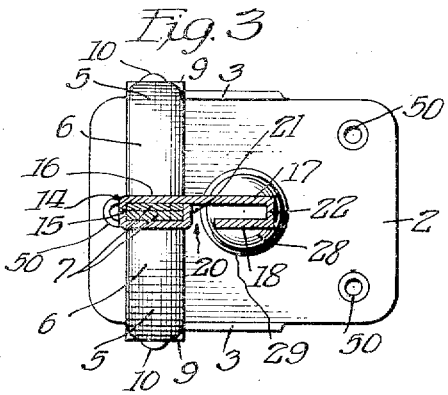
Inventor:
Harold G. Rice,
By Fisher Towle Clapp & Sears
attys.

H. G. RICE.
BOTTLE CAPPER.
APPLICATION FILED SEPT. 10, 1921.
Reissued Nov. 8, 1921.
15,222.
2 SHEETS—SHEET 2.
Fig. 6
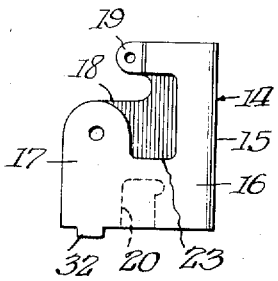
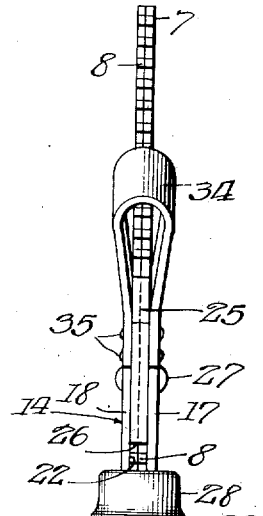
Fig. 4
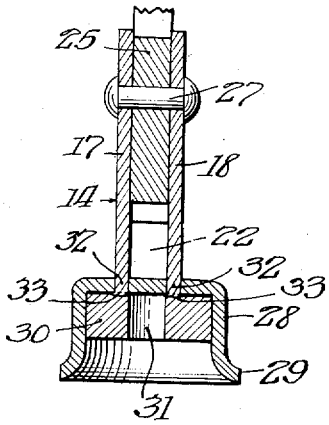
Fig. 7
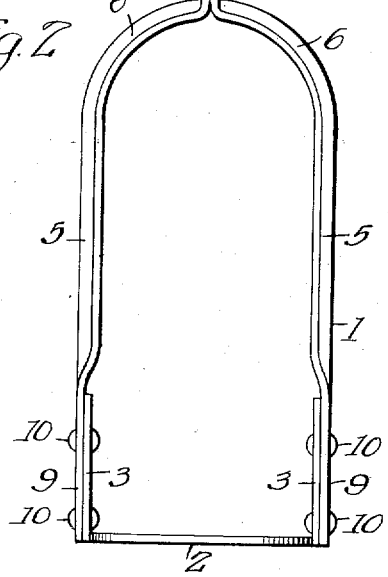
Inventor:
Harold G. Rice,
By Fisher Towle Clapp & Sears
Attys.

UNITED STATES PATENT OFFICE.

HAROLD G. RICE, OF CHICAGO, ILLINOIS.

BOTTLE-CAPPER.

15,222. Specification of Reissued Letters Patent. Reissued Nov. 8, 1921.

Original No. 1,376,583, dated May 3, 1921, Serial No. 427,004, filed November 29, 1920. Application for reissue filed September 10, 1921. Serial No. 499,841.

*To all whom it may concern:*

Be it known that I, HAROLD G. RICE, a citizen of the United States, residing at Chicago, in the county of Cook and State of Illinois, have invented a new and useful Bottle-Capper, of which the following is a specification.

It is the object of this invention to provide a bottle capper which, although made out of relatively thin stock, will have the necessary strength, the parts being so shaped and disposed with respect to each other that reinforcement will be provided where reinforcement is needed. The invention aims to provide novel means for imparting reciprocating movement to a rider which carries the capping head, the construction being such that the rider may be adjusted rapidly, upon occasion.

Within the scope of what is claimed, a mechanic may work changes in the precise structure shown, without departing from the spirit of the invention.

In the drawings:

Figure 1 shows in side elevation, a bottle capper constructed in accordance with the invention;

Fig. 2 is an elevation wherein the capper is viewed at right angles to the showing of Fig. 1;

Fig. 3 is a cross section on the line 3—3 of Fig. 1;

Fig. 4 is a section on the line 4—4 of Fig. 1;

Figs. 5 and 6 are elevations showing opposite sides of the rider.

The capper comprises a frame 1 including a foot plate 2 having upstanding flanges 3, the forward edges of which slant downwardly as shown at 4. Arms 5 are provided, the arms being trough-shaped in cross section, so that the arms, although made out of light stock, will have the necessary strength. The upper ends of the arms 5 are curved inwardly as shown at 6 and merge into flat strips 7 which are in contact. In the forward edges of the strips 7, notches are formed, the notches coöperating to form a rack 8. The arms 5 are provided at their lower ends with flat extensions 9 overlapped on the flanges 3 and connected thereto by securing elements 10. The flanges 3 project forwardly from the extensions 9, as shown at 11, thus enhancing the strength of the connection between the arms 5 and the foot plate 2. The strips 7 are connected by securing devices 12. There are holes 50 in the foot plate 2, to the end that the capper may be mounted on a table, shelf or other support.

The numeral 14 marks a rider. The rider 14 is fashioned from a single plate formed into a rear wall 15 and sides 16, one side having a first extension 18, and the other side having a second extension 17, the extensions being disposed in parallel relation. The first extension 18 is provided in its lower edge with a notch 20 defining an inner wing 21 prolonged transversely of the rider into engagement with the second extension 17. The first extension 18 is supplied with an outer wing 22 prolonged transversely of the rider, into engagement with the second extension 17. The second extension 17 has a notch 23 in its upper edge. The sides 16 are provided at their forward edges with ears 19 located above the extensions 17—18, the ears being united by a securing device 24. The strips 7 of the frame 1 are received slidably in the space defined by the rear wall 15, the sides 16, the inner wing 21 and the ears 19.

A lever 25 is located between the extensions 17 and 18 and is fulcrumed on a pivot element 27 mounted in the extensions. The outer wing 22 constitutes a stop limiting the downward swinging movement of the lever. A U-shaped handle 34 is secured to the lever 25 by rivets 35 or the like. At its inner end, the lever 25 is supplied with a segment 26 meshing into the rack 8. The notch 23 in the extension 17 exposes the rack 8 and the segment 26 at their place of meshing, to provide for the egress of dirt, the lever being in slidable contact with the first extension 18 at a point opposite to the notch, thereby to prevent lateral movement of the lever or the segment.

The numeral 28 designates a capping head of inverted cup-shape, provided at its lower edge with an outwardly slanting crimping flange 29. A cushion 30, of rubber or the like, is retained in the head 28 and has an opening 31 enhancing the resiliency of the cushion. Studs 32 are formed integrally with the lower ends of the extensions 17 and 18. The studs extend through the top of the head and are riveted thereto, as shown at 33.

When the lever 25 is swung upwardly or downwardly, the segment 26 coöperates with the rack 8 and causes a reciprocation of the rider 14 and the capping head 28. When quick adjustment of the rider 14 is desired, the lever 25 may be swung until the segment is out of mesh with the rack 8. Then, the rider 14 may be slid along the members 7. In this way, the capping head 28 may be adjusted properly to correspond with the height of the bottle, before the rider 14 and the head are forced downwardly by the coöperation between the segment and the rack when the lever 25 is operated.

Having thus described the invention, what is claimed is:—

1. In a bottle capper, a rider fashioned from a single plate formed into a rear wall, and sides having first and second extensions, the first extension having a notch in its lower edge, the notch defining an inner wing prolonged transversely of the rider into engagement with the second extension, the second extension having a notch in its upper edge, the sides being provided at their forward edges with ears located above the extensions, and a securing device connecting the ears; a frame comprising a rack received slidably in the space defined by the rear wall, the sides, the inner wing and the ears; a lever located between the extensions and fulcrumed thereon, the lever including a segment meshing with the rack, the notch in the second extension exposing the rack and segment at their place of meshing, to provide for the egress of dirt, the lever being in contact with the extension at a point opposite to said notch; and a capping head carried by the extensions.

2. In a bottle capper, a foot plate provided with upstanding flanges; arms which are trough-shaped in cross section, the arms being inwardly extended at their upper ends and terminating in flat strips which are in contact with each other, the strips having notches which coöperate to form a rack, the arms having flat lower extensions overlapped on the flanges of the foot plate; securing devices connecting the lower extensions of the arms with the flanges; a securing device uniting the strips; a rider slidable on the strips, the inwardly extended upper ends of the arms forming stops coöperating with the rider to limit the downward movement of the rider; a capping head carried by the rider; and a lever fulcrumed on the rider and including a segment meshing into the rack and coacting therewith to impart reciprocating movement to the rider and the head, the lever being movable into approximate parallelism with the rack, thereby to disengage the segment from the rack and to permit a free sliding movement of the rider on the strips toward and away from the stops.

3. In a machine for applying seals to bottles by pressure, the combination of a vertically extending rack constituting an upper frame extension, said rack comprising a toothed bar bifurcated at its lower end to provide spaced depending leg supports, a rider slidable on said bar and comprising a folded sheet metal part inclosing the rack bar, and having a pair of spaced extensions projecting outwardly beyond the teeth of the rack, a toothed segment pivoted between said spaced extensions and coöperating with said rack and a capping head on said rider under said segment.

4. In a manually-operated bottle-capping device, the combination of a base, a pair of arms extending upwardly from opposite sides of the base and having their upper ends secured together to form a bar of double thickness, said bar having teeth formed on one of its edges to form a rack, a rider slidable along said bar, a toothed segment meshing with said rack and pivoted on said rider, and a capping head carried by said rider for sealing a bottle supported on the base.

5. In a bottle capping device, the combination of a base, a pair of arms made of strap metal extending upwardly from opposite sides of the base and having upper portions brought together in overlapping relation and united to each other to form a flat bar of double thickness, said bar having teeth formed along one of its edges to form a rack, a rider slidable on said bar and comprising a sheet metal stamping inclosing the rack bar and having a pair of extensions projecting outwardly beyond the teeth of the rack and having their ends spaced apart, a pivot extending between said extensions, a toothed segment pivoted on said pivot and between said extensions and coöperating with said rack, and a capping head mounted on said rider below said segment.

6. In a machine for applying seals to bottles by pressure, the combination of a vertically extending rack constituting an upper frame extension, said rack comprising a toothed bar bifurcated at its lower end to provide spaced depending leg supports, a rider slidable on said bar and comprising a folded sheet metal part inclosing the rack bar, and having a pair of spaced extensions projecting outwardly beyond the teeth of the rack, a toothed segment pivoted between said spaced extensions and coöperating with said rack and a capping head on said rider under said segment, the capping head comprising an inverted bowl-shaped member provided with a pair of spaced apertures in its end, said rider extensions having depending portions extending through and secured in said apertures.

In testimony that I claim the foregoing as my own, I have hereunto affixed my signature.

HAROLD G. RICE.